July 23, 1929.  B. F. B. SEWELL  1,722,061
AUTOMOTIVE TRUCK ATTACHMENT
Original Filed Dec. 11, 1917   4 Sheets-Sheet 1
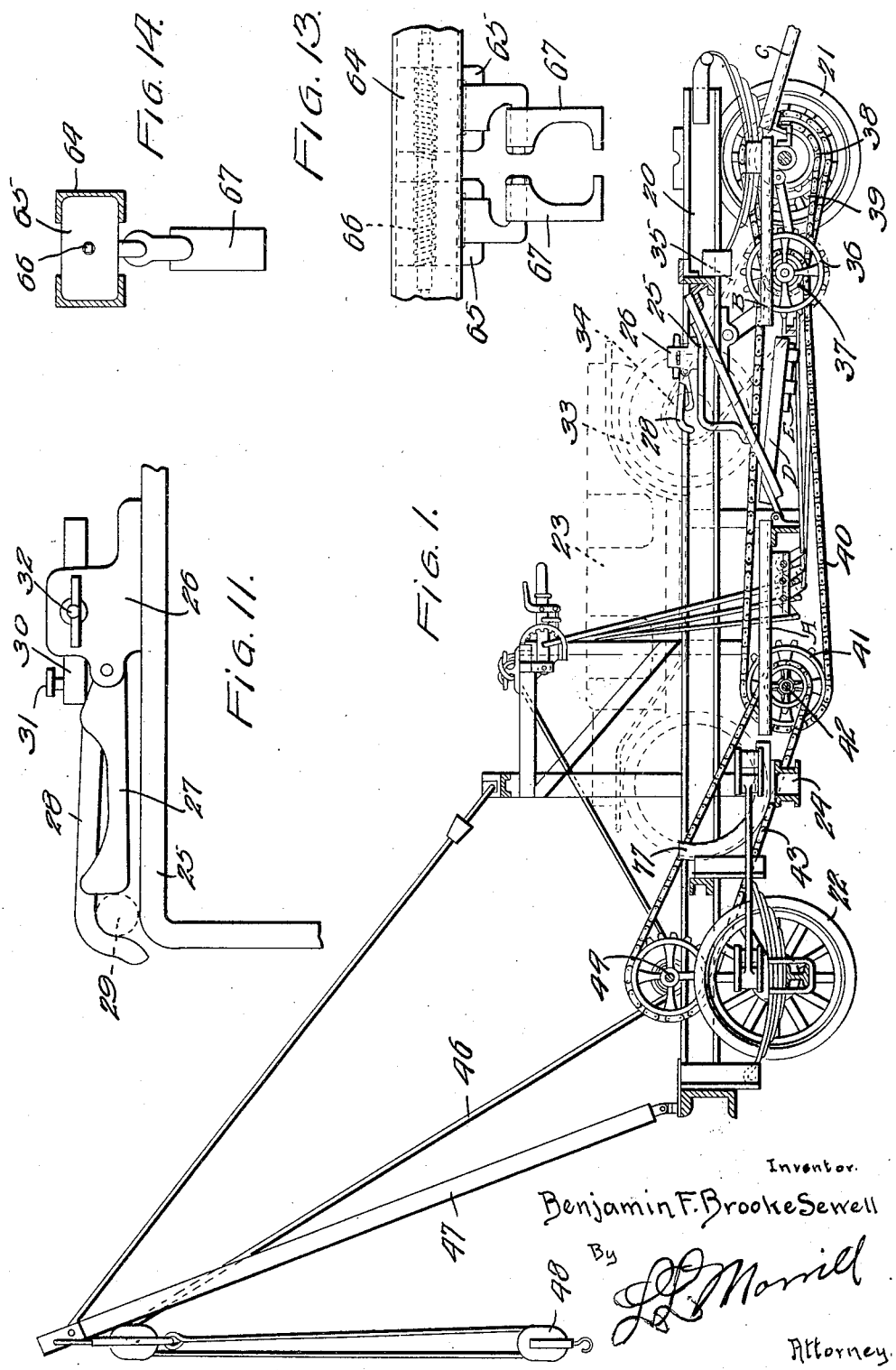
Inventor.
Benjamin F. Brooke Sewell
By L. L. Morrill
Attorney.

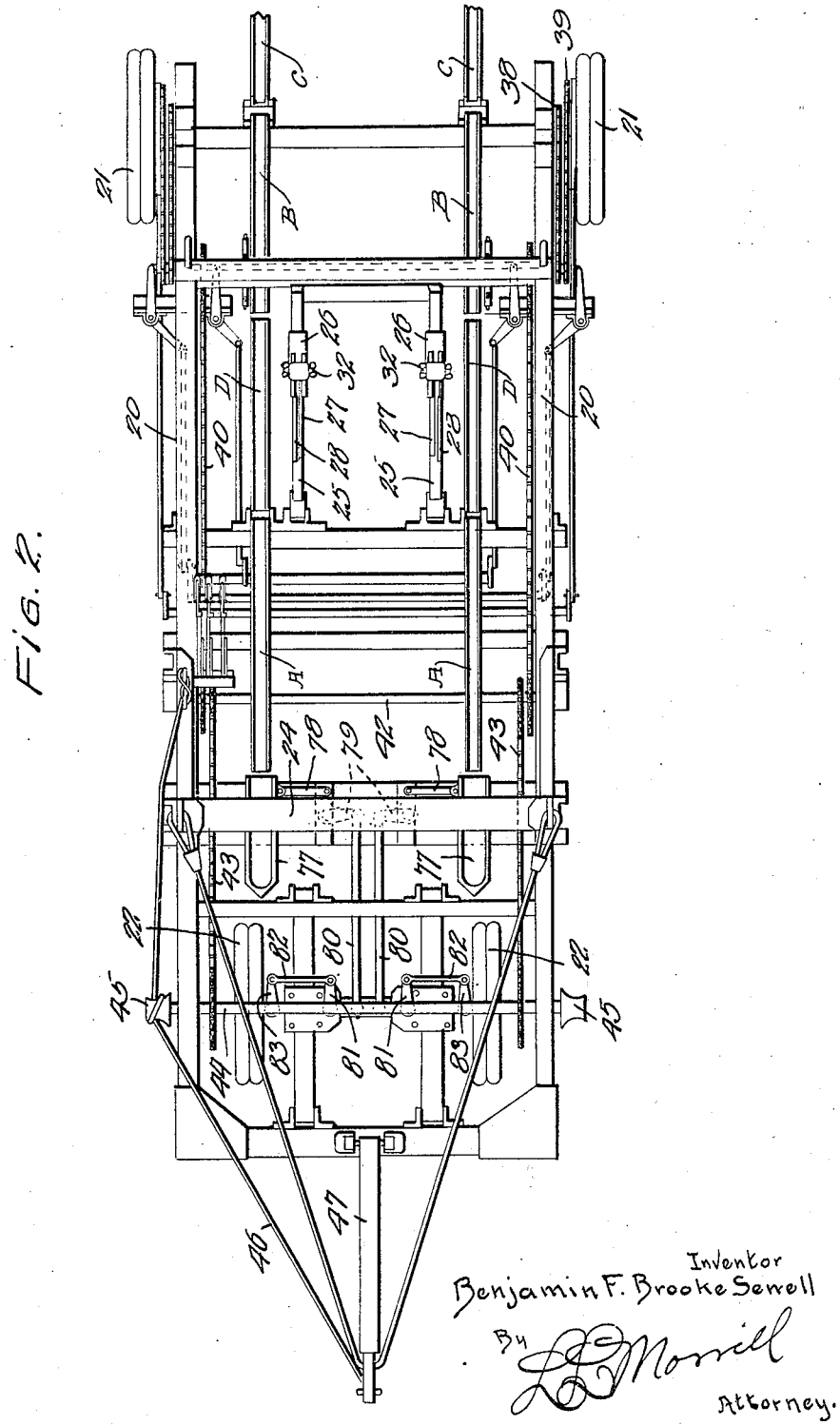

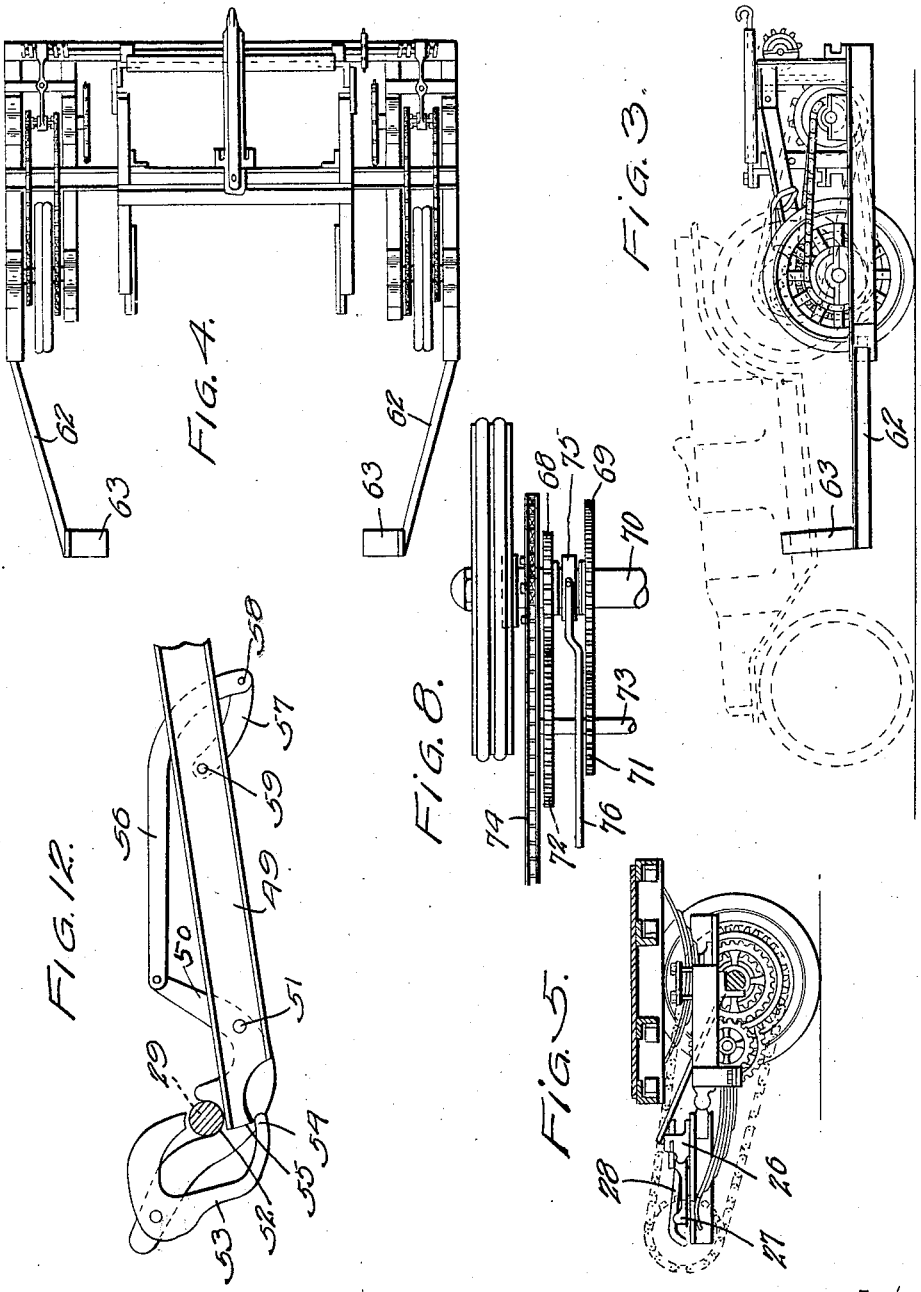

July 23, 1929.   B. F. B. SEWELL   1,722,061
AUTOMOTIVE TRUCK ATTACHMENT
Original Filed Dec. 11, 1917    4 Sheets-Sheet 4
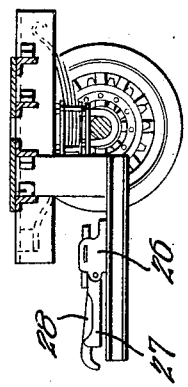
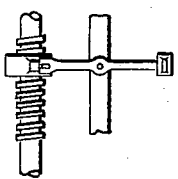
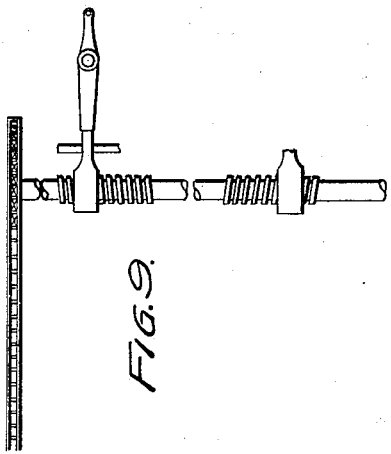
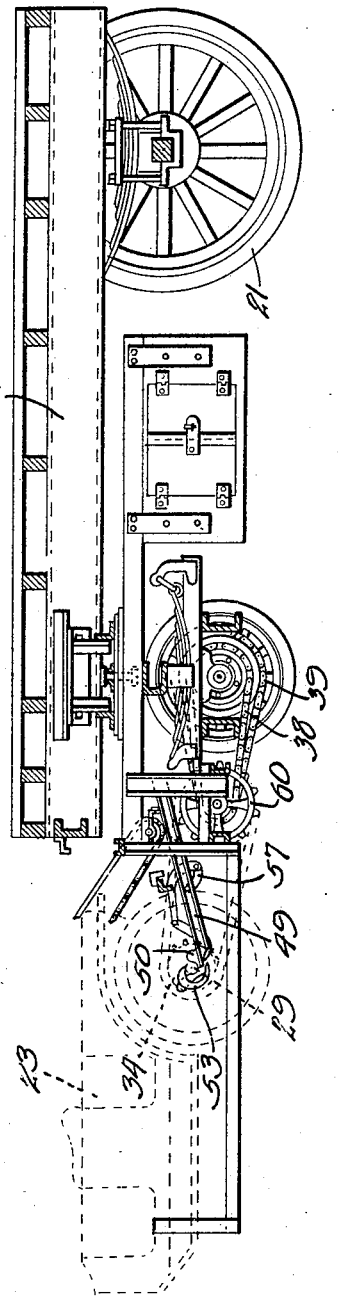
Inventor
Benjamin F. Brooke Sewell
By
L. L. Morrill
Attorney.

Patented July 23, 1929.

1,722,061

UNITED STATES PATENT OFFICE.

BENJAMIN F. BROOKE SEWELL, OF CHULA, VIRGINIA.

AUTOMOTIVE TRUCK ATTACHMENT.

Original application filed December 11, 1917, Serial No. 206,703. Divided and this application filed July 3, 1920. Serial No. 393,873.

This application is a division of application Serial No. 206,703, filed December 11, 1917.

This invention relates to automotive truck attachments, and has for an object to provide for improved means for attaching and detaching a traction unit to an automotive vehicle of substantially the usual and ordinary type to convert such vehicle into a tractor having improved means for quickly detaching the unit from the vehicle to return such vehicle to its normal use.

A further object of the invention is to provide a traction unit adapted to support in whole or in part the automotive vehicle so that at least the rear wheels of such vehicle are supported out of contact with the ground and power transmitted either from such supported wheels or sprocket replacing such wheels to the traction mechanism of the unit.

A further object of the invention is to provide a unit adapted to be coupled with an automotive vehicle to produce a tractor with improved means for taking off from the tractor driving mechanism power for operating other devices, as, for instance, a hoist.

With these and other objects in view, the device comprises certain novel units, elements, parts, combinations, arrangements and functions as will be hereinafter more fully described and claimed.

In the drawings:

Fig. 1 is a view in side elevation of one type of the tractor unit wherein and whereby the entire automotive vehicle is supported thereon.

Fig. 2 is a view of the type of tractor unit shown at Fig. 1 and seen in top plan.

Fig. 3 is a view in side elevation of a type of tractor unit supporting only the rear wheels of the automotive vehicle.

Fig. 4 is a view in top plan of the type of unit shown at Fig. 3.

Fig. 5 is a view in side elevation of a still different type of unit.

Fig. 6 is a view in side elevation of a type of unit embodying four wheels and an auxiliary body or bed, the forward wheels only being employed to support the rear wheels of the automotive vehicle, making thereby a six-wheeled combination.

Fig. 7 is a view in side elevation of still a different type of supporting unit.

Fig. 8 is a view in top plan of a clutch mechanism which may be used upon the several types of supporting units.

Fig. 9 is a view in top plan of a mechanical steering device intended more especially for the type of tractor shown at Fig. 1, but not so limited in its scope.

Fig. 10 is a view in top plan of a different type of mechanical steering device.

Fig. 11 is a view in side elevation of one type of clamp structure for securing the unit to the rear axle of the vehicle.

Fig. 12 is a view in side elevation of a different type of clamp.

Fig. 13 is a view in elevation of a clamp mechanism for securing the reach of the unit to the chassis frame.

Fig. 14 is a view of the clamp shown at Fig. 13, but seen in end elevation.

Like characters of reference indicate corresponding parts throughout the several views.

The subject-matter of the present application is mechanism broadly which may be quickly, conveniently and manually attached to and detached from an automotive vehicle of usual and ordinary construction having special reference to the type of machines ordinarily known as pleasure or passenger automobiles, whereby such vehicle may be converted readily into a tractor for farm or other purposes. Including especially a passenger or pleasure type of automobile is not intended, however, to exclude other types, as, for instance, trucks.

In its broad sense the tractor attachment comprises a vehicle unit of two or more wheels adapted to support the automotive vehicle in whole or in part, and especially to raise the traction wheels out of engagement with the ground and to take power therefrom, reduced in speed, transmitted to the wheels of the unit for driving the unit and the vehicle supported thereupon at a rate of speed much less than the ordinary speed of the vehicle under normal conditions.

As shown at Fig. 1, a unit of four wheels wholly supporting the automotive vehicle is shown. It comprises a bed 20 having rear or traction wheels 21 and forward or steering wheels 22. The automotive vehicle indicated in dotted lines at 23 is supported upon a crossbar 24 at the front and at the rear by carrying the axle of such vehicle upon the bracket 25. The bed 20 supports a track or runway for receiving and positioning the automotive vehicle. This track or runway is constructed in several sections, the sections A and B being rigid with the bed and with sections C hinged to form ramps for properly loading the automotive vehicle upon the device. Sections D are also hinged to the bed and means as the bolts E are employed to hold the sections D at times rigid and in alignment with the sections A and B and at other times to drop to the position shown at Fig. 1 to clear the wheel 33 of the automotive vehicle shown in dotted lines at said figure. The vehicle is clamped upon this bracket 25 by means of the clamping device shown at Fig. 11, it being understood, however, that the clamps shown at Fig. 11 and Fig. 12 are interchangeable upon the same unit. The clamp shown at Fig. 11 comprises a block 26 having secured thereto a member 27 with a hook 28 positioned to clamp between such hook 28 and member 27, the axle shown in dotted lines at 29. Means for exerting holding pressure upon the hook 28 comprises a bar 30 and set-screw 31 which is adjusted longitudinally by means of a screw 32.

Power is taken from the rear wheel shown in dotted lines at 33 by means of a sprocket applied at 34. This power is transmitted by the sprocket chain 35 to the sprocket 36 and from a reduced sprocket 37 to either the sprocket 38 or 39, according to the speed, the sprockets of different sizes being employed for the purpose of changing the speed. As the change speed does not enter into the present invention, it will not be further herein described, but any usual and ordinary type will be employed. From the sprocket 37 is also taken off the sprocket chain 40 to the sprocket 41 which drives shaft 42, which in turn, through the sprocket chain 43, drives the shaft 44, the latter being provided with any form of winch, as shown at 45, whereby a line 46 to the boom 47 is controlled, the line carrying a block 48 to produce a hoist.

At Fig. 6 a four-wheeled type of unit is also shown, but only the rear wheels of the automotive vehicle 23 are supported. A brace 49 is taken off from the unit and is provided with the clamp for engaging the rear axle of the vehicle. At Fig. 6 the clamp is shown as of the type disclosed at Fig. 12, but it is to be understood that the type shown at Fig. 11 is interchangeable therewith. The type shown at Fig. 12 comprises a member 50 pivoted to the bar 49 at 51 and provided with a notch 52 to receive and retain the axle 29. A hook 53 is pivoted to the member 50 and has a finger 54 positioned to engage against the corner 55 of the bar 49, and when the parts are in the position shown at Fig. 12 to bear upon the top of the axle 29 and clamp such axle firmly in position. The member 50 also serves for lifting the axle to raise the driving wheels of the vehicle off from the ground and is manipulated by means of a long link 56 and a short link 57 pivoted together at 58 and the latter link pivoted to the bar 49 at 59 so that the pivot 58 will pass the line between the pivots 51 and 59, holding the clamp in clamping position. Power is taken from the sprocket 34 to the sprocket 60, the front wheels of the unit 61 being in this case the traction wheels and change speed mechanism is shown at Fig. 6, but as it forms no essential part of the present invention is not further described.

At Figs. 3 and 4 another two-wheeled type of unit is shown having forwardly extending reaches 62 and clamping members shown in their entirety at 63. These clamping members 63 are shown in detail at Figs. 13 and 14. They comprise crossbars 64 having blocks 65 movably mounted therein manipulated by the right and left screw 66. These blocks 65 carry clamping jaws 67 which engage upon the chassis frame and secure the unit firmly in position.

At Figs. 5 and 7 other two-wheeled types of units are shown, but as the specific type of unit is not material to the present invention, the types are not further described.

At Fig. 8 a change speed mechanism is shown wherein gears 68 and 69 are loosely mounted upon the axle 70 with gears 71 and 72 mounted upon the shaft 73 driven by the sprocket chain 74.

Feathered upon the axle 70 is a clutch member 75 controlled by a manual lever 76 adapted to rigidly connect with the axle 70 selectively either the gear 68 or 69, thereby effecting change of speed.

In the two-wheeled types of units the steering is accomplished by means of steering the automotive vehicle in the usual and ordinary manner. This is also true in the four-wheeled type shown at Fig. 6, but in the type shown at Fig. 1 the entire vehicle being supported, the steering must be accomplished otherwise. Provision is here made comprising sheaths 77 into which the forward wheels of the vehicle are inserted. When these sheaths turn by steering the front wheels in the usual manner they actuate links 78, which in turn actuate bell crank levers 79, which in turn again move links 80, again moving bell crank levers 81. The bell crank levers 81 move links 82, which are connected directly to the steering knuckles 83, so that steering motion of the front wheels of the automotive vehicle is translated into steering motion for the front wheels 22 of the unit.

Provision is thereby made for steering any and all of the tractor units from the seat of the automotive vehicle and by the use of the usual and ordinary steering mechanisms provided thereby and thereon so that the operator may occupy the seat in the usual manner and be in full control of the various utilities provided thereby.

It is believed that the function and operation of the several units, parts and elements and their several combinations have been fully and sufficiently described in the description of their construction and organization so that further description of operation and function will not be necessary to a complete understanding of the devices.

I claim:

1. A tractor attachment for motor vehicles comprising a wheel supported bed, a support for one axle of the vehicle on said bed, a sectional track for loading said vehicle on said bed one section hinged to form a ramp and a section adapted to drop below the normal position and clear the vehicle on said support.

2. A tractor attachment for motor vehicles, comprising a wheel supported bed, a support for the rear axle of the vehicle on said bed, a sectional loading track for said vehicle guiding said vehicle to said support, and means to drop a section of the track to support the rear of said vehicle wholly upon said support.

3. A tractor attachment for motor vehicles, comprising a bed, supporting wheels for said bed, a support erected upon said bed adapted to support the rear axle of the vehicle thereon, a track composed of a plurality of sections and positioned to station the vehicle upon said support, means to drop a section of said track out of operative position with the rear axle supported on said support, and means to transmit power from said supported vehicle to the wheels of said bed.

In testimony whereof I affix my signature.

BENJAMIN F. BROOKE SEWELL.